(12) United States Patent
Smith et al.

(10) Patent No.: US 7,059,659 B2
(45) Date of Patent: Jun. 13, 2006

(54) VEHICLE DOOR BARRIER PANEL HAVING REMOVABLE ATTACHMENT TABS

(75) Inventors: Peter M. Smith, Belleville, MI (US); Steven Matoshko, Shelby Township, MI (US)

(73) Assignee: Lear Corporation, Southfield, MI (US)

( * ) Notice: Subject to any disclaimer, the term of this patent is extended or adjusted under 35 U.S.C. 154(b) by 38 days.

(21) Appl. No.: 10/899,185

(22) Filed: Jul. 26, 2004

(65) Prior Publication Data

US 2006/0017306 A1    Jan. 26, 2006

(51) Int. Cl.
*B60J 5/00*    (2006.01)
(52) U.S. Cl. ...................... 296/146.7; 49/502
(58) Field of Classification Search ............... 296/154, 296/146.7; 49/482.1, 501, 502
See application file for complete search history.

(56) References Cited

U.S. PATENT DOCUMENTS

| | | | |
|---|---|---|---|
| 5,056,199 A | 10/1991 | Stein et al. .................... 24/682 |
| 5,090,762 A | 2/1992 | Krieger ...................... 296/39.1 |
| 5,904,002 A | 5/1999 | Emerling et al. ............. 49/502 |
| 6,248,584 B1 | 6/2001 | Cahoon et al. ............. 435/325 |
| 6,381,906 B1 * | 5/2002 | Pacella et al. ................ 49/502 |
| 6,412,852 B1 | 7/2002 | Koa et al. ................. 296/146.7 |
| 6,422,640 B1 | 7/2002 | Whitehead et al. ....... 296/146.7 |
| 6,428,081 B1 * | 8/2002 | Williams et al. ......... 296/146.7 |
| 6,449,907 B1 * | 9/2002 | Nishikawa et al. ........... 49/502 |
| 6,474,721 B1 * | 11/2002 | Nishikawa et al. ...... 296/146.6 |
| 6,647,667 B1 | 11/2003 | Mine et al. ................ 49/490.1 |
| 6,659,536 B1 | 12/2003 | Chamberlain et al. ... 296/146.5 |
| 6,676,195 B1 | 1/2004 | Marriott et al. .......... 296/146.7 |
| 6,767,049 B1 | 7/2004 | Morrison et al. ........ 296/146.7 |
| 6,857,688 B1 * | 2/2005 | Morrison et al. ........ 296/146.7 |
| 6,938,944 B1 * | 9/2005 | Koa et al. .................... 296/152 |
| 2001/0017476 A1 * | 8/2001 | Nishikawa et al. ...... 296/146.6 |
| 2001/0027622 A1 | 10/2001 | Mine et al. ................ 49/490.1 |
| 2001/0030444 A1 | 10/2001 | Whitehead et al. ...... 296/146.7 |
| 2003/0001408 A1 | 1/2003 | Hockenberry et al. ... 296/146.7 |
| 2003/0068458 A1 | 4/2003 | Pattok et al. .............. 428/40.1 |
| 2003/0164624 A1 | 9/2003 | Kohara et al. ........... 296/146.7 |
| 2003/0218356 A1 | 11/2003 | Emerling et al. ........ 296/146.1 |
| 2004/0012219 A1 | 1/2004 | Banks ....................... 296/39.3 |

FOREIGN PATENT DOCUMENTS

JP          06144011 A   *   5/1994

* cited by examiner

*Primary Examiner*—Patricia L. Engle
(74) *Attorney, Agent, or Firm*—Bill Panagos

(57) ABSTRACT

A barrier panel adapted for operative attachment to a vehicle door panel. The barrier panel includes a main body portion and at least one tab adapted for operative attachment to the vehicle door panel. The tab extends from the main body portion and is removable from the main body portion. Furthermore, the barrier panel may be employed in a vehicle door assembly for facilitating reassembly of the same. A method of manufacturing the vehicle door assembly is also disclosed.

8 Claims, 5 Drawing Sheets

VEHICLE DOOR BARRIER PANEL HAVING REMOVABLE ATTACHMENT TABS

BACKGROUND OF THE INVENTION

1. Field of the Invention

The present invention relates, generally, to vehicle door barrier panels and, more specifically, to vehicle door barrier panels having removable attachment tabs.

2. Description of the Related Art

Automotive vehicles typically include door assemblies with inner and outer panels attached together. Oftentimes, a cavity is formed between the panels, and various components are positioned between the panels in the cavity. These components can include speakers, motors for power locks and windows, and the like.

One additional component that can be included between the door panels is a barrier panel. A barrier panel is a generally flat member used to acoustically insulate the interior of the vehicle from excessive road noise, to impede water from entering the interior of the vehicle, or for other uses. One exemplary barrier panel is shown in published U.S. Patent Application US2004/0012219A1 to Banks. As shown in that application, the barrier panel has a generally continuous periphery. A plurality of apertures is intermittently spaced about the periphery of the barrier panel, and fasteners attach the barrier panel to the door panels.

Although prior art barrier panels have generally functioned well for their intended purposes, they suffer from certain disadvantages experienced during manufacture of vehicle door assemblies. More specifically, in many vehicle door assembly designs, individual fasteners extend through the inner door panel, the barrier panel, and the outer door panel to secure all three panels together. Fasteners with longitudinally spaced ridges are often used for these purposes and the panels are fit between individual ridges to thereby retain the panels at a distance. Once assembled, however, the door assemblies are sometimes disassembled in order to access the cavity therein. For instance, disassembly may be necessary to replace a speaker, to repair the power window motor, or for other similar reason. Reassembling the door can be relatively difficult. Specifically, reassembling each panel between the desired ridges on the fasteners can be very frustrating and time consuming because there is limited space near those fasteners during reassembly. If the panels are not positioned correctly on the fasteners, the stack height of the panels may exceed the maximum allowable for proper assembly.

Therefore, there is an ongoing need in the art for a barrier panel that facilitates re-assembly of a vehicle door assembly.

SUMMARY OF THE INVENTION

The present invention overcomes the disadvantages of the related art in a barrier panel adapted for operative attachment to a vehicle door panel. The barrier panel includes a main body portion and at least one tab adapted for operative attachment to the vehicle door panel. The tab extends from the main body portion and is removable from the main body portion. Furthermore, the barrier panel may be employed in a vehicle door assembly for facilitating reassembly of the same.

The present invention is also directed toward a method of manufacturing a vehicle door assembly having a first door panel, a second door panel, and a barrier panel with a removable tab. The barrier panel is interposed between and operatively attached to the first and second door panels. The method includes the step of separating the first door panel from the second door panel and the barrier panel. The method continues by removing the tab from the barrier panel. The first door panel is then operatively attached to the second door panel such that the barrier panel is interposed between the first and second door panels.

One advantage of the present invention is that a barrier panel is provided that facilitates reassembly of a vehicle door. The removable tabs and the method of manufacturing the vehicle door assembly reduce re-assembly time, and manufacturing costs as well. Moreover, the barrier panel of the present invention reduces the number of vehicle door assembly inadvertently assembled with a stack-up height that exceeds assembly requirements.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
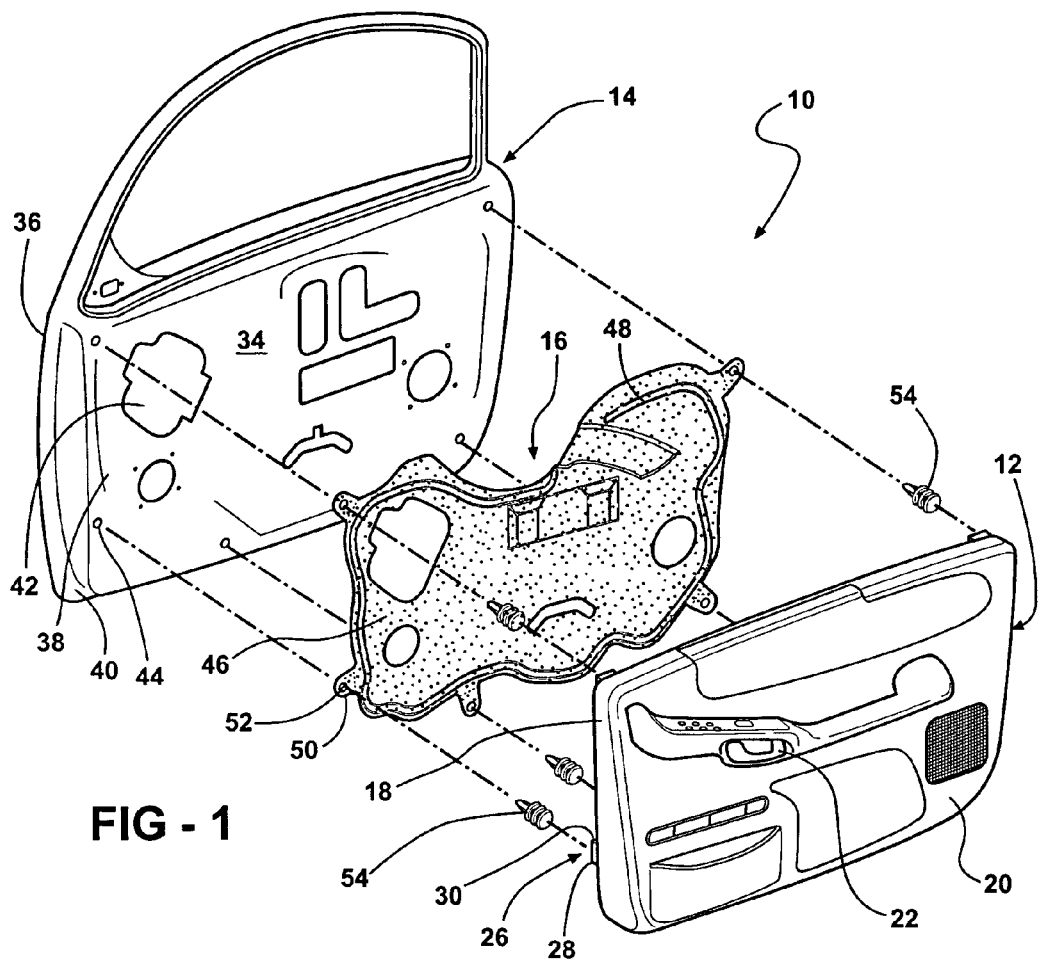
FIG. 1 is an exploded view of a vehicle door assembly that includes a barrier panel of the present invention.

Referring now to the drawings, where like numerals are used to designate like structure throughout the figures, an exploded view of one embodiment of a vehicle door assembly of the present invention is generally indicated at 10 in FIG. 1. Generally, the vehicle door assembly 10 includes a first door panel, a second door panel, and a barrier panel each generally indicated at 12, 14, and 16, respectively. The barrier panel 16 is interposed between the first and second door panels 12, 14, and the barrier panel 16 is operatively attached to the first and second door panels 12, 14 as described in greater detail below.

The first door panel 12 and the second door panel 14 can include any number of attached sheets, brackets, and the like. However, for purposed of clarity, the first and second door panels 12, 14 will be referred to as single members except where noted. In the embodiment shown, the first door panel 12 is a trim panel for positioning adjacent the interior of the vehicle and the second door panel 14 is an exterior door panel that defines a portion of the exterior of the vehicle. However, one of ordinary skill in the art will appreciate that the first door panel 12 could be an exterior panel, and the second door panel 14 could be an interior panel without departing from the spirit of the invention. Furthermore, the vehicle door assembly 10 can be of any suitable shape and size to fit the desired portion of the vehicle (not shown). Indeed, the vehicle door assembly 10 shown in FIG. 1 represents only one embodiment and could be a driver's side door, a passenger side door, a rear door for a station wagon, van, or sports utility vehicle, a tailgate or hatchback door, or any other type of vehicle door assembly without departing from the spirit of the invention.

In the embodiment shown, the first door panel 12 has an inner surface 18 and an outer surface 20. The outer surface 20 faces the interior of the vehicle (not shown), and the inner surface 18 is opposite to the outer surface 20. The outer surface 20 can be outfitted with a variety of decorative trim features such as contoured surfaces, cushioning materials, and the like. A handle 22 is also included on the outer surface 20 for opening and closing the door assembly 10. The first door panel 12 also includes a plurality of fastening brackets generally indicated at 26. As shown in FIGS. 1 and 6A–6C, each fastening bracket 26 includes two attachment plates 28 extending outward from the inner surface 18 of the first door panel 12 and a front plate 30 joined to each of the attachment plates 28 such that the front plate 30 and the inner surface 18 are separated at a distance. An aperture 32 extends through the front plate 30 of each fastening bracket 26.

The second door panel 14 also has an inner surface 34 and an outer surface 36. The outer surface 36 faces the exterior of the vehicle, and the inner surface 34 is opposite to the outer surface 36. In the embodiment shown, the second door panel 14 includes a first rigid sheet 38 joined to a second rigid sheet 40. The first rigid sheet 38 faces the first door panel 12 to thereby define the inner surface 34 of the second door panel 14. The second rigid sheet 40 faces the exterior of the vehicle to thereby define the outer surface 36 of the second door panel 14. Each sheet 38, 40 is contoured and the sheets 38, 40 are joined in a known manner to form a cavity 42 therebetween. The second door panel 14 also includes a plurality of apertures 44 extending through the first sheet 38. The number of apertures 44 corresponds with the number of apertures 32 formed in the fastening brackets 26 of the first door panel 12, and the apertures 44 are aligned with corresponding apertures 32 as shown in FIG. 1.

Figure 2:
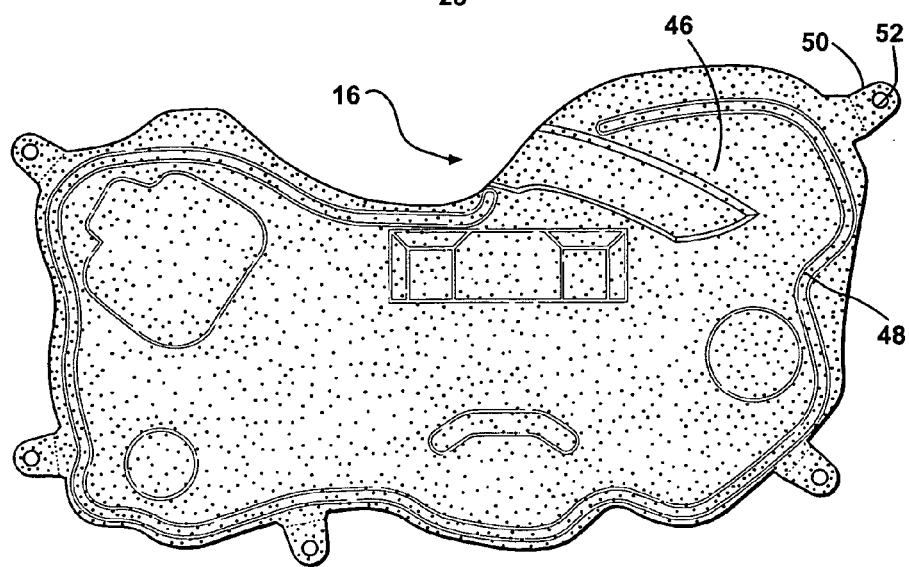
FIG. 2 is an elevated view of the barrier panel of the present invention.

As shown in FIGS. 1 and 2, the barrier panel 16 includes a main body portion 46. The main body portion 46 is generally planar and is sized so as to correspond to the size of the first and second door panels 12, 14. The main body portion 46 also includes depressions and projections where necessary to allow positioning of door handles, speakers, motors, and/or other components to be fit within the door assembly 10. The barrier panel 16 can be made from a polymeric material and vacuum formed to create the contours, depressions, and projections. The barrier panel 16 can be used to reduce road noise heard inside the vehicle.

Figure 6A:
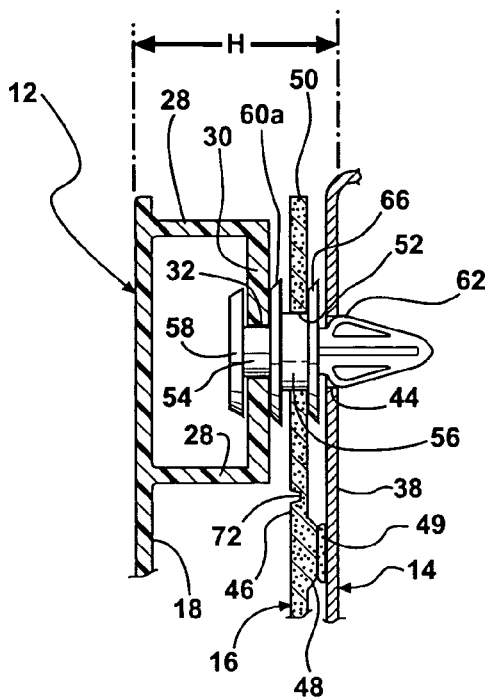
FIGS. 6A–6C are sectional views of the vehicle door assembly showing manufacturing steps of the same.

In one embodiment, the barrier panel 16 includes a rail 48. The rail 48 is elongate and projects from the main body portion 46 toward the second sheet 40 of the second door panel 14. The rail 48 extends around nearly the entire periphery of the main body portion 46. As shown in FIG. 6A, an adhesive bead 49 can be applied along the rail 48, and by pressing second door panel 14 into the adhesive bead, the second door panel 14 can be sealably attached to the main body portion 46 of the barrier panel 16. This seal can inhibit water from entering the interior of the vehicle (not shown).

The barrier panel 16 also includes at least one and, preferably, a plurality of tabs 50. Each tab 50 is generally rectangular and has a width that is substantially less than that of the main body portion 46. The tabs 50 extend outwardly from the main body portion 46 of the barrier panel 16 and are spaced intermittently about the periphery of the main body portion 46.

As stated above, the barrier panel 16 is adapted for operative attachment to the first and second door panel 12, 14. For instance, in one embodiment, each tab 50 includes at least one aperture 52 extending therethrough. The tabs 50 are positioned on the barrier panel 16 such that the apertures 52 of the tabs 50 are axially aligned with the apertures 32, 44 of the first and second door panels 12, 14. As shown in FIGS. 1 and 6A, the door assembly 10 includes at least one fastener 54, and a single fastener 54 extends through the apertures 32, 44, 52 to thereby operatively attach the respective tab 50 of the barrier panel 16 to the first and second door panels 12, 14. The fasteners 54 can be of any suitable type, such as those manufactured by Emhart Teknologies with a part numbers of 11519031 and 11519032. In the embodiment shown, each fastener 54 includes a shaft 56, a disc-like head 58 at one end of the shaft 56, and a plurality of disc-like ridges 60a, 60b intermittently spaced along the shaft 56. The shaft 56 also includes a plurality of raised lips 62 located at the end opposite to that of the head 58. When the fasteners 54 are attached, the front plate 30 of the first door panel 12 is positioned between the head 58 and one ridge 60a, the tab 50 of the barrier panel 16 is positioned between the two ridges 60a, 60b and the first sheet 38 of the second door panel 14 is positioned between one ridge 60b and the lips 62. The ridges 60a, 60b can be made of a resilient material to be deformed during assembly. However, each of the head 58, the ridges 60a, 60b, and the lip 62 has a diameter greater than that of the apertures 32, 44, 52 such that the panels 12, 14, 16 are retained by the fastener 54. As will be discussed in greater detail below, the tabs 50 of the barrier panel 16 facilitate reassembly of the vehicle door assembly 10.

Figure 3A:
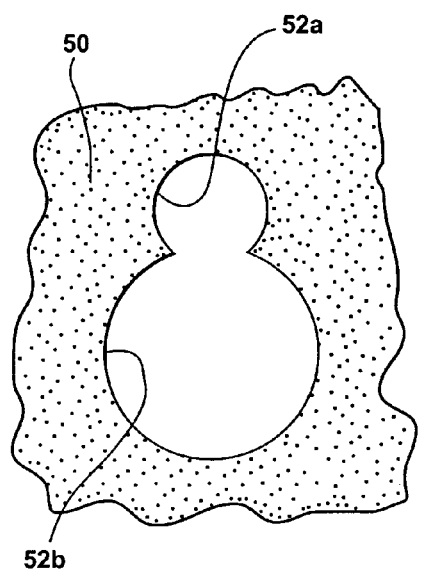
FIGS. 3A–3D are detail views of four different embodiments of a tab of the barrier panel of the present invention.
Figure 3B:
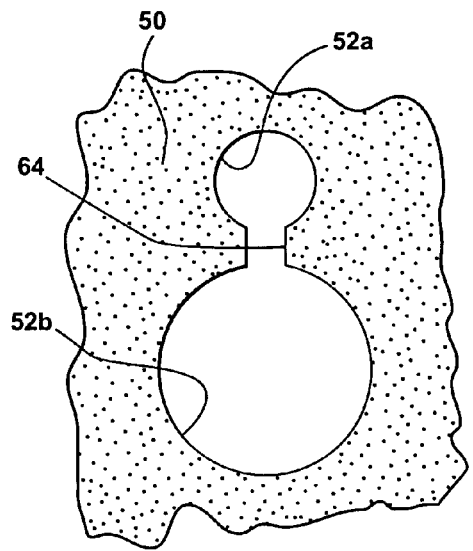
Figure 3C:
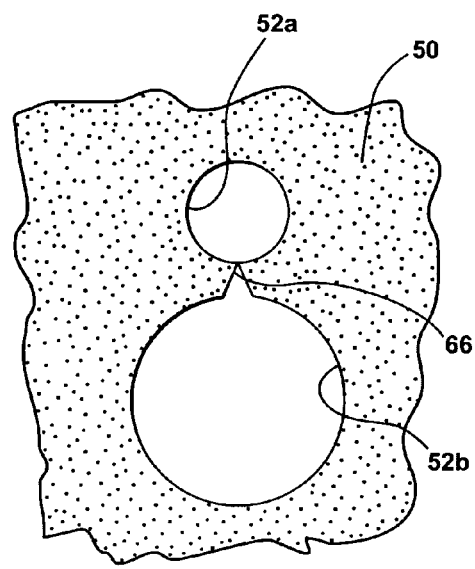
Figure 3D:
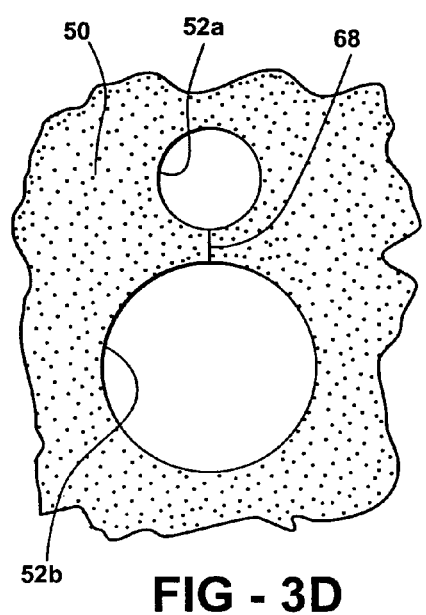

In one embodiment, each tab 50 of the barrier panel 16 includes a plurality of apertures 52a, 52b extending therethrough. FIG. 3A illustrates one such embodiment that includes two apertures 52a, 52b of different sizes. Preferably, one of the apertures 52a is sized according to the size of the shaft 56 of the fastener 54, and the other aperture 52b is sized according to the size of the ridges 60a and 60b. Also in each embodiment, the apertures 52a, 52b are connected to each other such that when the fastener 54 is positioned through one of the apertures 52b, the fastener 54 can slide transversely into to the other aperture 52a. In the embodiment of FIG. 3A, the apertures 52a, 52b are directly connected such that the arcuate peripheries of the apertures 52a, 52b intersect. The embodiments illustrated in FIGS. 3B-3D are variations on the embodiment shown in FIG. 3A, and each embodiment includes a plurality of apertures 52a, 52b that are connected to each other. Specifically, in the embodiment of FIG. 3B, the apertures 52a, 52b are connected via a slot 64. In the embodiment of FIG. 3C, the apertures 52a, 52b are connected via a triangular wedge 66. Also, in the embodiment of FIG. 3D, the apertures 52a, 52b are connected via a slit 68. During installation, the fastener 54 moves through the larger aperture 52b without interference from the ridges 60a, 60b. Then, when the barrier panel 16 is positioned between the ridges 60a, 60b, the barrier 16 is shifted in a direction transverse to the axis of the fastener 54 until the fastener 54 is positioned within the smaller aperture 52a. As such, the barrier panel 16 can be installed without having to bend the ridges 60a, 60b of the fastener 54.

Figure 4A:
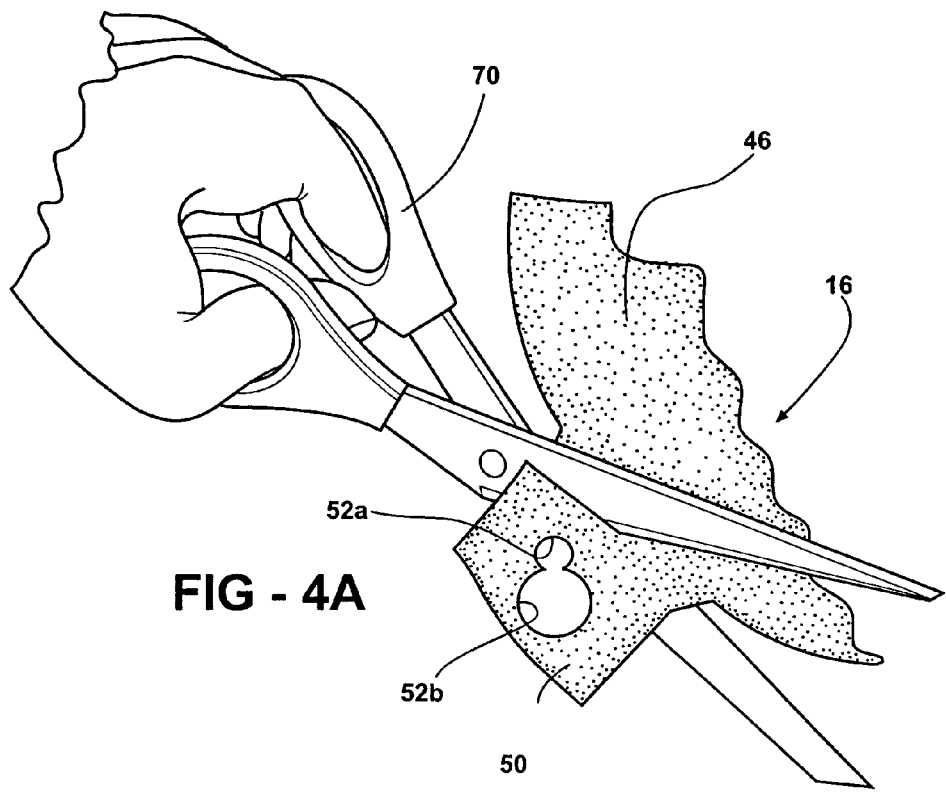
FIGS. 4A–4B is a detail view of two different embodiments of the tab, each being removed from the respective barrier panel.
Figure 4B:
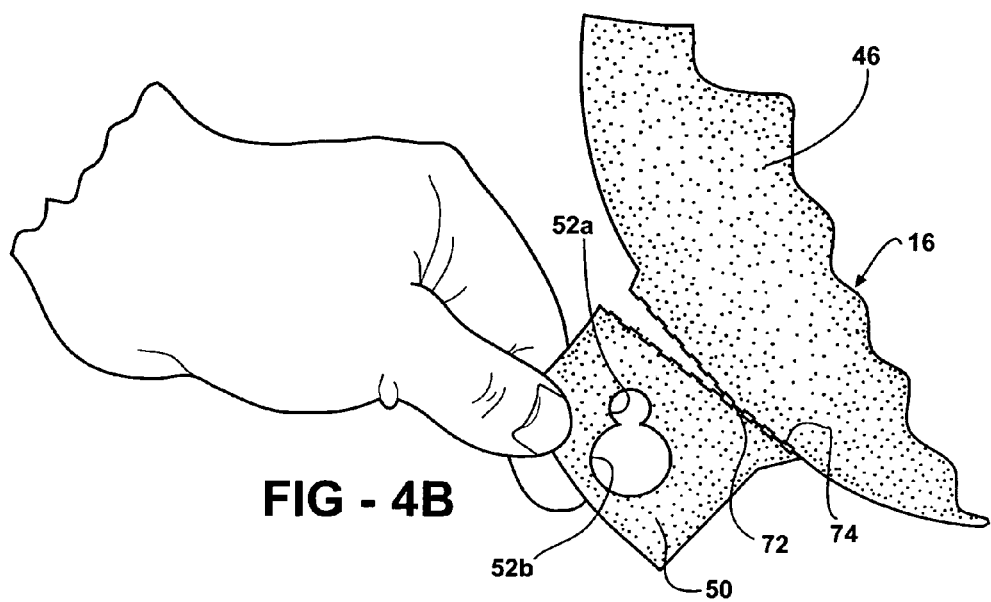
Figure 5A:
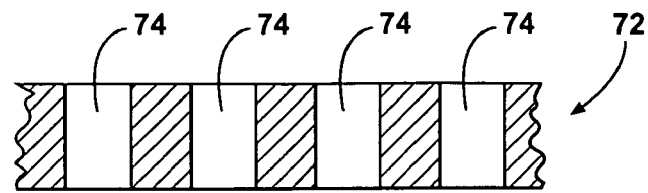
FIGS. 5A–5D are sectional view of four different embodiments of a perforated edge of the tab.
Figure 5B:
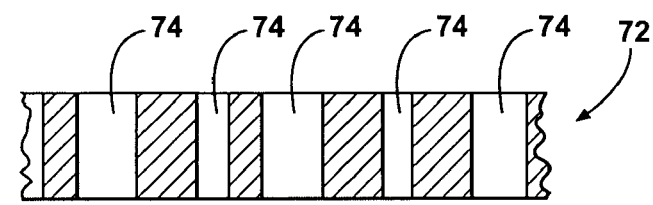
Figure 5C:
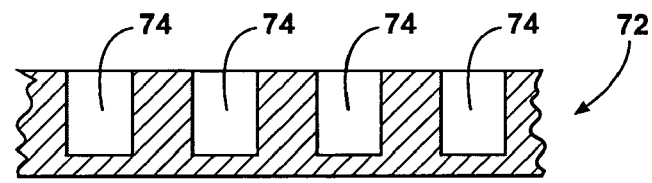
Figure 5D:
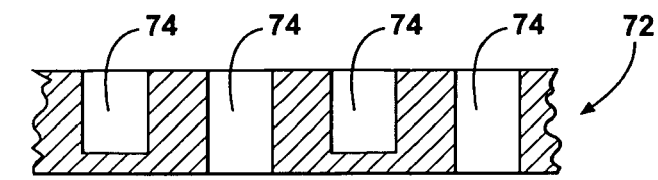

When the vehicle door assembly 10 is assembled, the tabs 50 of the barrier panel 16 are operatively attached to the first and second door panels 12, 14 via the fasteners 54. However, there are times when the vehicle door assembly 10 is disassembled. Thus, in order to facilitate reassembly of the vehicle door assembly 10, the tabs 50 are removable from the main body portion 46 of the barrier panel 16 as shown in FIGS. 4A and 4B. For instance, in the embodiment shown in FIG. 4A, the tabs 50 can be removed from the main body portion 46 with a cutting tool 70. Preferably, the width of the tab 50 is relatively small allowing quick removal of the tab 50 with the cutting tool 70. In another embodiment shown in FIG. 4B, the tabs 50 include a perforated edge 72 removably attaching the respective tab 50 to the main body portion 46. The perforated edge 72 includes at least one and, preferably, a plurality of perforations 74 of any suitable style.

FIGS. 5A–5D illustrate four different styles of perforations 74. In one embodiment shown in FIGS. 5A and 5B, the perforated edge 72 includes full perforations 74, meaning that each perforation 74 extends through the entire thickness of the barrier panel 16. In another embodiment shown in FIG. 5C, the perforated edge 72 includes partial perforations 74, meaning that each perforation 74 extends partially through the thickness of the barrier panel 16. In still another embodiment shown in FIG. 5D, the perforated edge 72 includes a combination of partial and full perforations 74. The perforated edge 72 can also include either variably spaced (FIG. 5B) or evenly spaced (FIG. 5A, 5C) perforations 74. In each embodiment shown in FIGS. 5A–5D, the perforated edge 72 preferably allows the tab 50 to be removed by hand from the main body portion 46 of the barrier panel 16.

Figure 6B:
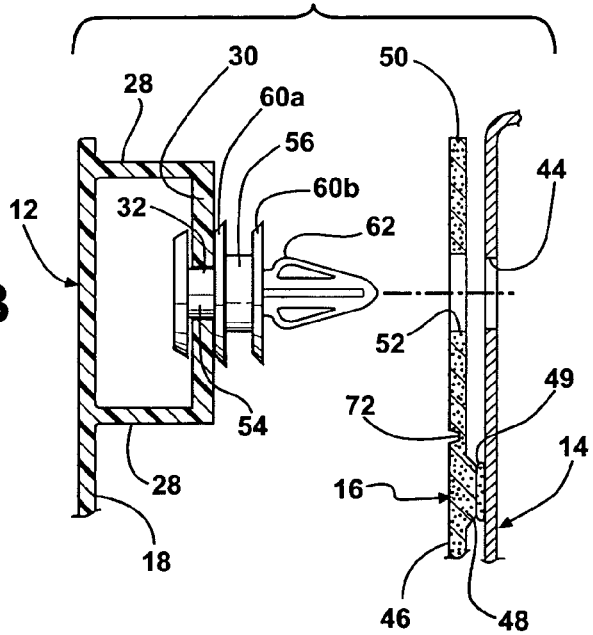
Figure 6C:
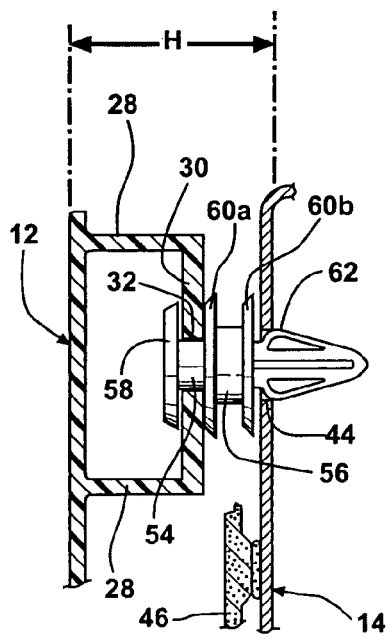

The removable tabs 50 of the barrier panel 16 facilitate reassembly of the vehicle door assembly 10 as illustrated in FIGS. 6A–6C. As shown in FIG. 6A, when the vehicle door assembly 10 is assembled, the first door panel 12, second door panel 14, and barrier panel 16 are separated by the ridges 60a, 60b of the fastener 54. This creates a predetermined stack-up height, H. In one embodiment, the method of manufacture involves sealably attaching the barrier panel 16 to the second door panel 14 with an adhesive bead 49 applied to the rail 48 as discussed above. The manufacturer may need to access the area between the first and second door panels 12, 14. In this case, manufacture continues by separating the first door panel 12 from the second door panel 14 and the barrier panel 16 as shown in FIG. 6B. In one embodiment, the second door panel 14 and the barrier panel 16 are moved axially off of the fasteners 54, and the ridge 60b of the fastener 54 is flexible enough to move through the aperture 52 of the tab 50. The barrier panel 16 and the second door panel 14 remain attached due to the adhesive bead 49, and the fastener 54 remains attached within the aperture 32 of the first door panel 12. When the vehicle door assembly 10 is to be reassembled, it can be difficult to move the tab 50 over the ridge 60b of the fastener 54, and the stack-up height, H, can be too great as a result. Thus, the method of manufacture of the present invention involves removing the tabs 50 from the barrier panel 16. The tabs 50 can be removed by cutting the tab 50 from the barrier panel 16, or by separating the tab 50 from the barrier panel 16 along the perforated edge 72. Next, the method involves operatively attaching the first door panel 12 to the second door panel 14 such that the barrier panel 16 is interposed between the first and second door panels 12, 14 as shown in FIG. 6C. Specifically, removal of the tab 50 allows the fastener 54 to move axially through the aperture 44 of the first sheet 38 of the second door panel 14 until the first sheet 38 is between the ridge 60b and lip 62 of the fastener 54. As such, the stack-up height, H, is once again at the predetermined value.

It is noted that the adhesive bead 49 supports the barrier panel 16 to the second door panel 14 even though the tabs 50 have been removed. Those having ordinary skill in the art will recognize that any suitable additional fasteners or fastening processes can be utilized to further assemble the vehicle door assembly 10 without departing from the spirit of the invention.

In summary, the barrier panel 16 and the method of manufacturing the vehicle door assembly 10 of the present invention facilitates re-assembly of the vehicle door assembly 10. The tabs 50 can be easily removed during re-assembly such that the fasteners 54 can move axially through the apertures 44 of the second door panel 14 without creating undesirable stack-up between the panels 12, 14, 16. Removal of the tabs 50 reduces re-assembly time otherwise spent trying to move the barrier panel 16 over the ridge 60b of the fastener 54. This reduction of time saves manufacturing costs as well. Moreover, the barrier panel 16 and the method of manufacturing of the present invention reduce the number of vehicle door assembly 10 inadvertently assembled with a stack-up height, H, that exceeds requirements.

The present invention has been described in an illustrative manner. It is to be understood that the terminology, which has been used, is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A barrier panel adapted for operative attachment to at least one vehicle door panel, the vehicle door panel defining at least one aperture therethrough and including a corresponding fastener adapted to be received within the aperture and operatively attach said barrier panel to the vehicle door panel, said barrier panel comprising:
   a main body portion and an adhesive disposed between said main body portion and the vehicle door panel so as to adhesively attach said barrier panel to the vehicle door panel; and
   at least one tab defining at least one aperture through which the fastener extends to mechanically attach said barrier panel to the vehicle door panel, said tab extending from said main body portion and removable from said main body portion to facilitate reassembly of the vehicle door panel, wherein said barrier panel retains adhesive attachment to the vehicle door panel.

2. A barrier panel as set forth in claim 1, wherein said tab includes at least one perforated edge removably attaching said tab to said main body portion.

3. A barrier panel as set forth in claim 1, wherein said tab defines a plurality of apertures of different sizes and connected to each other such that when the fastener extends through one of said apertures of said tab, the fastener can slide transversely into any of the other of said apertures of said tab.

4. A barrier panel as set forth in claim 1, wherein said main body portion includes a rail, said adhesive being disposed between said rail and the vehicle door panel for adhesively attaching said main body portion of said barrier panel to the vehicle door panel.

5. A vehicle door assembly comprising:
   at least one door panel defining at least one aperture therethrough and including a corresponding fastener adapted to be received within said aperture; and
   a barrier panel having a main body portion and an adhesive disposed between said main body portion and said door panel so as to adhesively attach said barrier panel to said door panel and at least one tab defining at least one aperture through which said fastener extends to mechanically attach said barrier panel to said door panel, said tab extending from said main body portion and being removable from said main body portion to facilitate reassembly of said vehicle door assembly, wherein said barrier panel retains adhesive attachment to said door panel.

6. A vehicle door assembly as set forth in claim 5, wherein said tab includes at least one perforated edge removably attaching said tab to said main body portion.

7. A vehicle door assembly as set forth in claim 5, wherein said tab defines a plurality of apertures of different sizes and connected to each other such that when said fastener extends through one of said apertures of said tab, said fastener can slide transversely into any of the other of said apertures of said tab.

8. A vehicle door assembly as set forth in claim 5, wherein said main body portion includes a rail, said adhesive being disposed between said rail and said door panel for adhesively attaching said main body portion of said barrier panel to said door panel.

* * * * *